United States Patent
Dsouza

(10) Patent No.: US 10,114,738 B2
(45) Date of Patent: Oct. 30, 2018

(54) METHOD AND SYSTEM FOR AUTOMATIC GENERATION OF TEST SCRIPT

(71) Applicant: Wipro Limited, Bangalore (IN)

(72) Inventor: Melwyn Anthony Dsouza, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 0 days.

(21) Appl. No.: 15/463,544

(22) Filed: Mar. 20, 2017

(65) Prior Publication Data

US 2018/0267887 A1 Sep. 20, 2018

(30) Foreign Application Priority Data

Mar. 16, 2017 (IN) .............................. 201741009022

(51) Int. Cl.
*G06F 11/36* (2006.01)
*G06F 17/27* (2006.01)
*G06N 99/00* (2010.01)

(52) U.S. Cl.
CPC ...... *G06F 11/3684* (2013.01); *G06F 11/3664* (2013.01); *G06F 11/3688* (2013.01); *G06F 17/274* (2013.01); *G06F 17/2705* (2013.01); *G06N 99/005* (2013.01)

(58) Field of Classification Search
CPC .................................................. G06F 11/3684
USPC ........................................................ 717/124
See application file for complete search history.

(56) References Cited

U.S. PATENT DOCUMENTS

| 7,917,895 | B2 | 3/2011 | Givoni et al. | |
|---|---|---|---|---|
| 9,047,414 | B1* | 6/2015 | Matyjek | G06F 11/3688 |
| 2003/0196191 | A1* | 10/2003 | Hartman | G06F 11/3684 717/126 |
| 2005/0086022 | A1* | 4/2005 | Lindberg | G06F 11/3684 702/123 |
| 2008/0320462 | A1* | 12/2008 | Bergman | G06F 9/45512 717/168 |
| 2013/0097586 | A1* | 4/2013 | Chandra | G06F 11/3684 717/124 |
| 2016/0132426 | A1 | 5/2016 | Crawshay et al. | |
| 2018/0011780 | A1* | 1/2018 | Aggarwal | G06F 11/3672 |

* cited by examiner

*Primary Examiner* — James D. Rutten
(74) *Attorney, Agent, or Firm* — Finnegan, Henderson, Farabow, Garrett & Dunner LLP

(57) ABSTRACT

Disclosed herein are a method and system for automatic generation of a test script. The method may include acquiring a plurality of test steps from a database, the plurality of test steps being associated with a test case and including one or more words in natural language. The method may also include identifying, using natural language processing on the plurality of test steps, one or more actions to be performed in a testing process. The method may include generating, based on the identified one or more actions, the test script to perform the plurality of test steps. The method may further include identifying, by performing the natural language processing on the plurality of test steps, an expected test result associated with each test step. The method may additionally include generating, a validation script based on the expected test result associated with each of the plurality of test steps.

20 Claims, 3 Drawing Sheets

US 10,114,738 B2

METHOD AND SYSTEM FOR AUTOMATIC GENERATION OF TEST SCRIPT

TECHNICAL FIELD

This disclosure relates generally to development of software applications, and more particularly, to method and system for automatic generation of test script for testing of software applications.

BACKGROUND

Application testing is a major component in a development lifecycle of software applications. Application testing can, in some instances, consume as much or more time as development of an application itself. In such context, automation of manual application testing tasks can provide huge improvements in speed and accuracy during testing of developed software applications and ensure quality of developed applications.

Currently, in automated application testing, a test engineer can use "record and playback" test automation tools. These tools require the test engineer to manually record test steps of a test case and then play it back on the application. Recording the test steps involves recording all aspects of a user's interaction with the application, for example, mouse clicks, data entry, observing actions and results, and the like. Additionally, expected test results need to be manually specified to a testing tool and this activity needs to be repeated for most of the test steps in each test case.

There are several technical problems in conventional systems and methods of automated application testing. It is common for software applications being tested to have over fifty thousand test cases and a huge amount of effort is needed to manually record the test steps for each test case and specify the expected test results for multiple test steps of each test case. Additional manual effort is required for development of application regression test suites. Conventional systems and methods are therefore prone to errors due to the large number of test cases and the huge amount of manual effort involved. Further, there are inconsistencies in implementation because different test engineers may automate the test cases differently. There is also a requirement for increased maintenance efforts of a test automation script in case of any changes in an application being tested, for example, new features added to the application or existing features modified in the application. The test scripts created manually need to also be updated manually due to changes in the application being tested. Additionally, quality issues can arise due to errors in the test automation script created by the test engineer and therefore the test automation script itself needs to be tested to ensure that the application is being tested by the test script as per requirements.

SUMMARY

Embodiments of the present disclosure present technological improvements as solutions to one or more of the above-mentioned technical problems in conventional software application development.

Embodiments of the present disclosure provide method and system for automatic generation of test script. In one embodiment, a method for automatic generation of test script is provided. The method includes: acquiring, by a system, a plurality of test steps from a database, the plurality of test steps being associated with a test case and including one or more words in natural language; identifying using natural language processing, by the system, one or more actions to be performed in a testing process based on the plurality of test steps; generating, by the system, the test script based on the identified one or more actions, wherein the test script is executable by one or more processors to perform the plurality of test steps; identifying, by the system, an expected test result associated with each of the plurality of test steps by performing the natural language processing on the plurality of test steps; and generating, by the system, a validation script based on the expected test result associated with each of the plurality of test steps, wherein the validation script is executable by the one or more processors to validate whether the expected test result occurred.

In another embodiment, a system for automatic generation of a test script is provided. The system includes one or more hardware processors and a memory unit storing instructions executable by the one or more hardware processors for acquiring a plurality of test steps from a database, the plurality of test steps being associated with a test case and including one or more words in natural language; identifying, using natural language, one or more actions to be performed in a testing process based on the plurality of test steps; generating the test script based on the identified one or more actions, wherein the test script is executable by the one or more hardware processors to perform the plurality of test steps; identifying an expected test result associated with each of the plurality of test steps by performing natural language processing on the plurality of test steps; and generating a validation script based on the expected test result associated with each of the plurality of test steps, wherein the validation script is executable by the one or more processors to validate whether the expected test result occurred.

In yet another embodiment, a non-transitory computer readable storage medium is provided. The storage medium stores a program that, when executed by a processor, cause the processor to perform a method of acquiring a plurality of test steps from a database, the plurality of test steps being associated with a test case and including one or more words in natural language; identifying, using natural language, one or more actions to be performed in a testing process based on the plurality of test steps; generating the test script based on the identified one or more actions, wherein the test script is executable by the one or more hardware processors to perform the plurality of test steps; identifying an expected test result associated with each of the plurality of test steps by performing natural language processing on the plurality of test steps; and generating a validation script based on the expected test result associated with each of the plurality of test steps, wherein the validation script is executable by the one or more processors to validate whether the expected test result occurred.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments described herein provide system and method for automatic generation of test script. As described above, there are several technical problems in conventional system and methods for providing automatic generation of test scripts. The disclosed system and method can provide cognitive natural language processing (NLP) to understand the context of the test case, and can automatically convert the test step actions into actionable test automation scripts. The test automation scripts may be generated in test automation frameworks such as, IBM Rational Functional Tester (RFT), and Hewlett Packard Quick Time Professional (QTP). The test scripts can be played back whenever an application needs to be tested.

The disclosed system and method can provide cognitive NLP to understand the expected result from a test case step, and can automatically generate scripts in automation languages like, for example Python or Selenium, in order to verify or validate the expected result from the test case.

The embodiments described herein can provide a cognitive system that utilizes a standard automation framework for implementing the test script automation. Conventional systems for implementing test script automation are primarily record-and-playback tools that require the user to manually record all the actions with the application under test (AUT) and then non-intelligently playback those actions. The disclosed system and method can provide a cognitive solution that may read the test step actions, understand the context of those actions with respect to the AUT and domain and then automatically convert those actions into actionable test automation scripts. Further, the disclosed system and method can also provide a cognitive solution for automating the validation part of the test step and determining whether the test case is successful. The embodiments described herein can also determine changes to an application user interface (UI) and update the test automation script accordingly.

Figure 1:
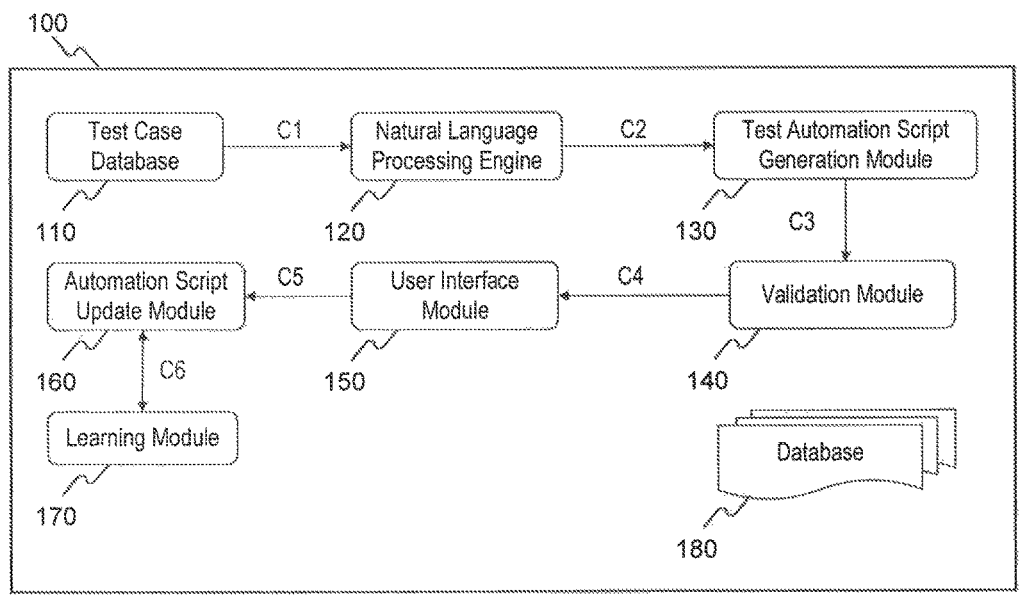
FIG. 1 is a block diagram illustrating an exemplary system for automatic generation of test execution script, according to some embodiments of the present disclosure.

FIG. 1 illustrates an exemplary system 100 for automatic generation of test execution script, in accordance with some embodiments of the present disclosure. Exemplary system 100 can include a test case database 110, a natural language processing (NLP) engine 120, a test automation script generation module 130, a validation module 140, a user interface module 150, an automation script update module 160, a learning module 170, and a database 180. Further, the connections C1, C2, C3, C4, C5 and C6 denote that the various modules may be directly or indirectly connected through one or more intermediate components.

For the purposes of this disclosure, "modules" may be implemented in software, hardware, firmware, a mix of any of those, or the like. For example, if the disclosed "modules" are implemented in software, they may be stored in a memory associated with computer system 301 in FIG. 3. Processors, I/O devices, and memory devices may be used to perform processes to implement and facilitate operations of the modules. Thus, the modules may include code instructions executable by one or more processors, alone or in various combinations with other modules disclosed in this or other embodiments. If the disclosed "modules" are implemented in hardware, they may include an embedded system or other dedicated hardware configured by machine code, assembly code, or the like to interact with other modules to perform functions consistent with disclosed embodiments.

Test case database 110 can store a list of test cases that are to be automated. Test case database 110 may also store test execution reports. Test cases can be organized as test suites at the top level, where the test suites may contain one or more test cases. Each test case may include one or more test steps and each test step may have an associated expected test result. Comparison of a test result with the associated expected test result can determine whether the corresponding test step passed or failed. This hierarchy may be maintained in test case database 110 depending on the needs of a project.

Natural language processing engine 120 can use artificial intelligence and computational linguistics to derive the meaning and context from human or natural language input in the test step actions and the expected test results. Natural language processing engine 120 can understand the context of the project and the domain of the application.

Test automation script generation module 130 can receive as input, the test case steps from test case database 110 and output of NLP engine 120, and use these inputs to generate a test script as its output, by automation. The generated test scripts may be in test automation languages like Selenium, IBM Rational Functional Tester (RFT), Hewlett Packard Quick Time Professional (QTP), and the like. The generated test scripts, when executed either manually or by a test management system, can execute the actions of the test case.

Validation module 140 can receive as input, the expected result of each test step and output of NLP engine 120, and use these inputs to generate a test validation script as its output. The generated test validation script, when executed, can determine whether the test step has passed or failed.

User interface module 150 can provide a user interface to interact with system 100. User interface module 150 can provide an interface for viewing the test cases, test steps, expected result, test report and the generated automation test script. In some embodiments, user interface module 150 can also provide an interface for settings like, for example, the folder location where the generated test scripts should be placed.

Automation script update module 160 can examine the AUT to determine if there are any changes to the user interface of the AUT. If any changes are detected, automation script update module 160 can accordingly update the previously generated test automation script. The AUT can be scanned for its user interface controls, for example, buttons, edit box, text labels, radio buttons, menu items, drop downs, etc. The text on the user interface controls can then be extracted and processed using NLP and machine learning (ML) techniques like, for example, classification, tokenization, synonym detection, stemming, tagging, parsing, and semantic analysis, to correlate the test step actions with the user interface controls. Automation script update module 160 can update the test script based on the updates to the user interface. As an example, the AUT may have a button labelled "Login", and a test step that references that button (for example, click on the "Login" button). In this example, the test step would fail if the AUT is updated in a new release of the application and the "Login" button is now labelled "Sign In." However, system 100 can use NLP and ML to search for synonyms of "Login" from a dictionary (general, or domain, or application specific) and then use the search results to try and execute the test step successfully. In case the test step is executed successfully, system 100 can update the test script so that future executions would not fail.

Learning module 170 can be used to improve the accuracy of system 100. In instances where system 100 does not provide the desired output and the user has to manually provide the desired output, learning module 170 can incorporate the instance into its database for future reference.

Figure 2:
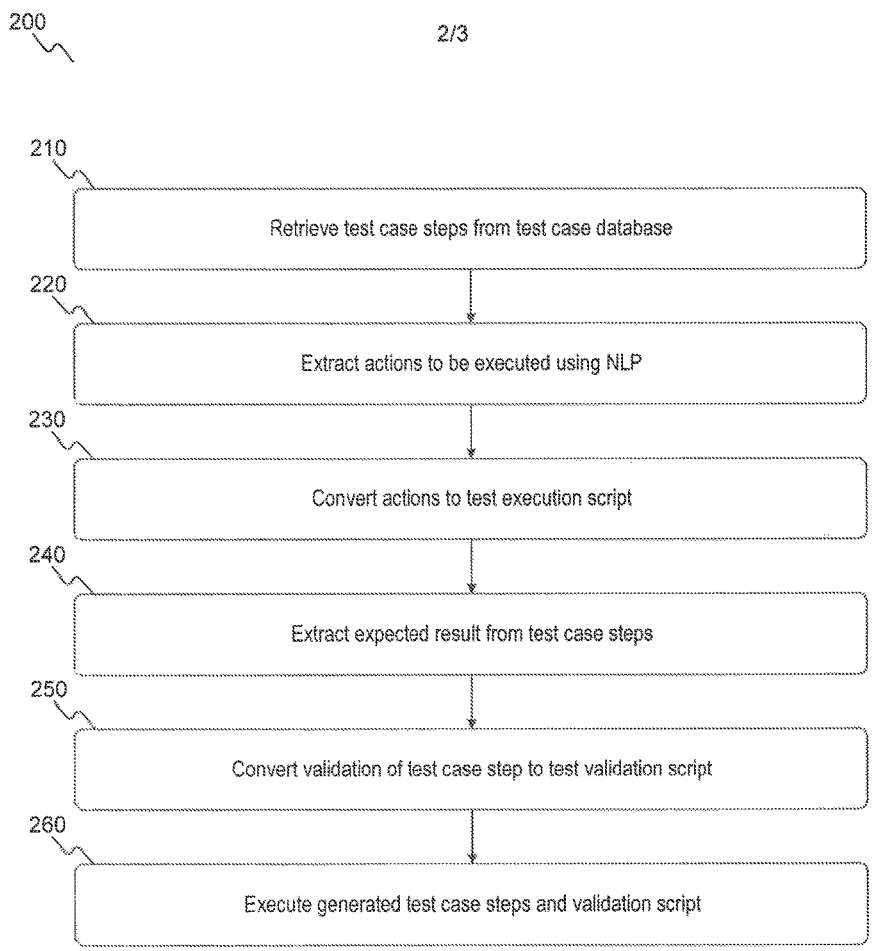
FIG. 2 is a flow diagram illustrating an exemplary method for automatic generation of test execution script, according to some embodiments of the present disclosure.

FIG. 2 illustrates an exemplary method 200 for providing automatic generation of test execution script, in accordance with some embodiments of the present disclosure. Referring to FIG. 2, it will be readily appreciated by one of ordinary skill in the art that the illustrated procedure can be altered to modify the order of steps, delete steps or further include additional steps. In some embodiments, method 200 can be performed, for example, by exemplary system 100 of FIG. 1.

In step 210, method 200 may begin by retrieving the list of test cases to be automated from a test case database. The list of test cases may be retrieved, for example, from test case database 110 of FIG. 1. In some embodiments, the test cases can also be retrieved from other test management applications like, for example, Microsoft team foundation server (TFS), IBM rational quality manager (RQM), HP quality center (QC), HP application lifecycle management (ALM). The test management applications may provide an application programming interface (API) to expose the stored test case data for consumption by client programs. In some embodiments, in the absence of a formal test management system, the test cases can also be imported from Microsoft Excel or Microsoft Word applications.

In step 220, method 200 may proceed by using NLP and ML to extract the actions that are to be executed from the test steps of test cases retrieved in step 210. Step 220 may be performed by a NLP engine (for example, NLP engine 120 of FIG. 1). The extraction of actions in step 220 can be performed using text processing libraries like, for example, natural language toolkit (NLTK), ClearTK or machine learning for language toolkit (MALLET) for classification, tokenization, stemming, tagging, parsing, and semantic analysis of the test steps in the test cases. NLP may be used to understand what action needs to be done (for example, clicking on a hyperlink) and further to collect information about it (for example, which hyperlink to click). In some embodiments, step 220 can proceed using tokenization to break down the test steps into words, phrases, symbols and other meaningful elements. These elements can become the input for further processing in step 230. In some embodiments, NLP parsing can be used in step 220 to identify and extract the noun phrases (NP) and verb phrases (VP) from the test steps. As an example, a test step "Click on the Submit button" can be broken down into the verb "Mouse click" and the noun "Submit button".

In step 230, method 200 can convert the actions that are to be executed (e.g., the NP and VP) identified in step 220 into actionable test execution script. Step 230 can be performed by a test automation script generation module (for example, test automation script generation module 130 of FIG. 1). The actionable test execution script may be generated in test automation languages like, for example, Selenium, IBM RFT, Hewlett Packard QTP, and the like. Test automation languages provide functions to simulate user input like mouse clicks, keyboard clicks (text input), button press, drop down selection and other actions on GUI elements. For example, the exemplary test step "Click on the Submit button" described above can be converted to the following code in Selenium language:

driver.findElements (By.className("Submit")).get(0).click( )

Similar actionable test code can be generated using the other test automation languages such as RFT, QTP, etc.

In step 240, method 200 may proceed by using NLP and ML to extract the expected test result for each test step retrieved in step 210. Step 240 may be performed by a NLP engine (for example, NLP engine 120 of FIG. 1). The extraction of expected test results can be performed using text processing libraries like, for example, NLTK, ClearTK or MALLET for classification, tokenization, stemming, tagging, parsing, and semantic analysis of the expected result in the test case. NLP may be used to understand what the tester expects to see when the test step is completed (for example, a text message stating "Checkout successful") and to collect further information about it (for example, display location for the text message).

In step 250, method 200 can convert the expected test results extracted in step 240 into test validation script in test automation languages such as, for example, Selenium, IBM RFT, Hewlett Packard QTP, Hewlett Packard unified functional testing (UFT), etc. Step 250 can be performed by a validation module (for example, validation module 140 of FIG. 1). The test automation languages provide verification or validation points which may be used for validating whether an expected test result was obtained.

In step 260, method 200 can proceed by executing the test execution script generated in step 230 and the test validation script generated in step 250 on the AUT. The test case result can be determined as pass or fail based on the outcome of the executed test step. In some embodiments, a test report which provides a summary of all the test runs can be generated.

Computer System

Figure 3:
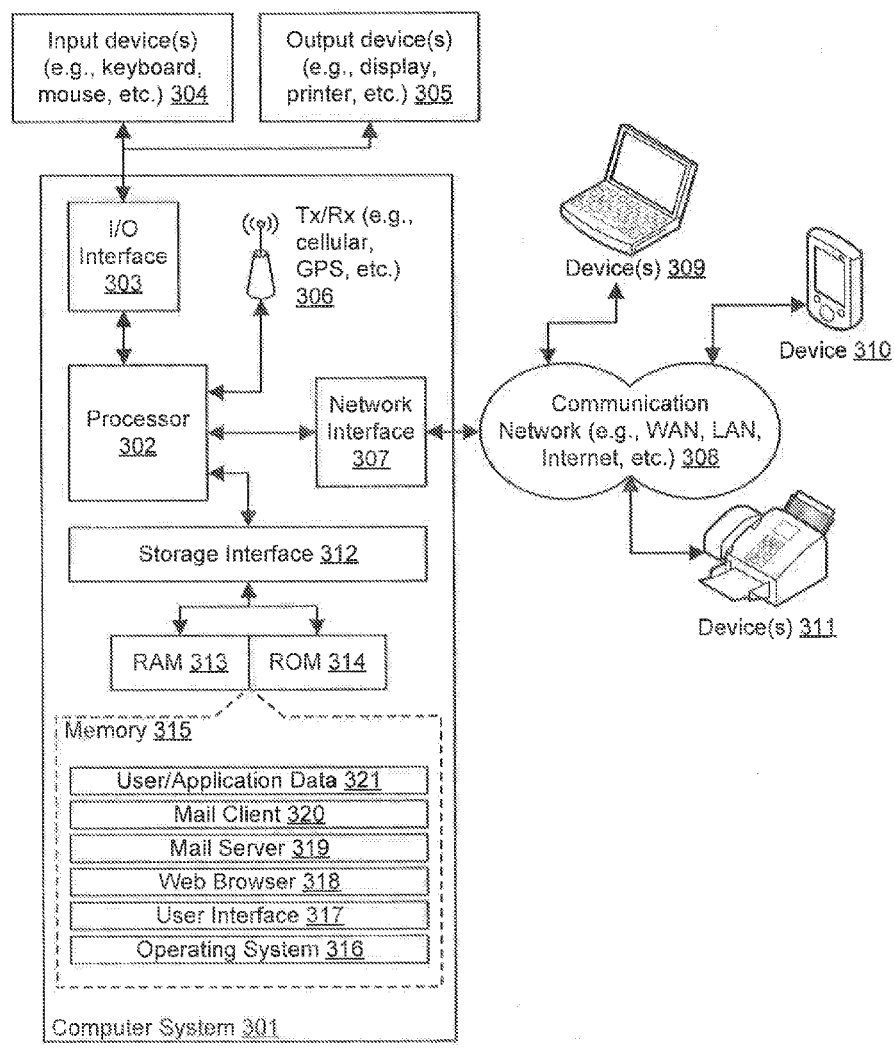
FIG. 3 is a block diagram of an exemplary computer system for implementing embodiments consistent with the present disclosure.

FIG. 3 is a block diagram of an exemplary computer system for implementing embodiments consistent with the present disclosure. Variations of computer system 301 may be used for implementing the devices and systems disclosed herein. Computer system 301 may include a central processing unit ("CPU" or "processor") 302. Processor 302 may include at least one hardware processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 302 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 302 may be disposed in communication with one or more input/output (I/O) devices via I/O interface 303. The I/O interface 303 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 303, the computer system 301 may communicate with one or more I/O devices. For example, the input device 304 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 305 may be a printer, fax machine, video display (e.g., cathode ray tube (CRT), liquid crystal display (LCD), light-emitting diode (LED), plasma, or the like), audio speaker, etc. In some embodiments, a transceiver 306 may be disposed in connection with the processor 302. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 302 may be disposed in communication with a communication network 308 via a network interface 307. The network interface 307 may communicate with the communication network 308. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 308 may include, without limitation, a direct interconnection, local area network (LAN), wide area network (WAN), wireless network (e.g., using Wireless Application Protocol), the Internet, etc. Using the network interface 307 and the communication network 308, the computer system 301 may communicate with devices 309, 310, and 311. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 301 may itself embody one or more of these devices.

In some embodiments, the processor 302 may be disposed in communication with one or more memory devices (e.g., RAM 313, ROM 314, etc.) via a storage interface 312. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, the databases disclosed herein.

The memory devices may store a collection of program or database components, including, without limitation, an operating system 316, user interface 317, web browser 318, mail server 319, mail client 320, user/application data 321 (e.g., any data variables or data records discussed in this disclosure), etc. The operating system 316 may facilitate resource management and operation of the computer system 301. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 317 may facilitate display, execution, interaction, manipulation, or operation of program components through textual or graphical facilities. For example, user interfaces may provide computer interaction interface elements on a display system operatively connected to the computer system 301, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 301 may implement a web browser 318 stored program component. The web browser may be a hypertext viewing application, such as Microsoft Internet Explorer, Google Chrome, Mozilla Firefox, Apple Safari, and the like. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 301 may implement a mail server 319 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 301 may implement a mail client 320 stored program component. The mail client may be a mail viewing application, such as Apple Mail, Microsoft Entourage, Microsoft Outlook, Mozilla Thunderbird, etc.

In some embodiments, computer system 301 may store user/application data 321, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

The specification has described systems and methods for automatic generation of test script. The illustrated steps are set out to explain the exemplary embodiments shown, and it should be anticipated that ongoing technological development may change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

I claim:

1. A method for automatic generation of a test script and a validation script for an application under test, the method comprising:
    acquiring, by a system, a plurality of test steps from a database, the plurality of test steps being associated with a test case and including one or more words in natural language;
    identifying, by the system, one or more actions to be performed in a testing process based on the plurality of test steps by using natural language processing;
    generating, by the system, the test script based on the identified one or more actions, wherein the test script is executable by one or more processors to perform the plurality of test steps;
    identifying, by the system, an expected test result associated with each of the plurality of test steps by performing the natural language processing on the plurality of test steps; and
    generating, by the system, a validation script based on the expected test result associated with each of the plurality of test steps, wherein the validation script is executable by the one or more processors to validate whether the expected test result occurred, and wherein the natural language processing provides at least one of a context or a domain with respect to the application under test.

2. The method of claim 1, further comprising:
    executing, by the system, the test script and the validation script on the application under test.

3. The method of claim 2, further comprising:
    determining whether a user interface associated with the application under test is modified; and
    updating the test script and the validation script based on the determination.

4. The method of claim 1, wherein identifying the one or more actions to be performed in the testing process includes parsing the one or more words included in the plurality of test steps to identify one or more noun phrases and one or more verb phrases in the plurality of test steps.

5. The method of claim 1, wherein the test script is generated in a test automation framework.

6. The method of claim 1, wherein the natural language processing uses a text processing library.

7. The method of claim 1, wherein the validation script is generated in a test automation framework.

8. The method of claim 1, further comprising providing a user interface for a user to view the test script and set a folder location for storing the test script.

9. A system for automatic generation of a test script and a validation script for an application under test, the system comprising:
    one or more hardware processors; and
    a memory storing instructions that, when executed by the one or more hardware processors, cause the one or more hardware processors to perform operations comprising:
        acquiring a plurality of test steps from a database, the plurality of test steps being associated with a test case and including one or more words in natural language;
        identifying one or more actions to be performed in a testing process based on the plurality of test steps by using natural language processing;
        generating the test script based on the identified one or more actions, wherein the test script is executable by the one or more hardware processors to perform the plurality of test steps;
        identifying an expected test result associated with each of the plurality of test steps by performing natural language processing on the plurality of test steps; and
        generating a validation script based on the expected test result associated with each of the plurality of test steps, wherein the validation script is executable by the one or more hardware processors to validate whether the expected test result occurred, and wherein the natural language processing provides at least one of a context or a domain with respect to the application under test.

10. The system of claim 9, wherein the memory stores instructions that, when executed by the one or more hardware processors, cause the one or more hardware processors to further perform operations comprising:

executing the test script and validation script on the application under test.

11. The system of claim 10, wherein the memory stores instructions that, when executed by the one or more hardware processors, cause the one or more hardware processors to further perform operations comprising:

determining whether a user interface associated with the application under test is modified; and updating the test script and validation script based on the determination.

12. The system of claim 9, wherein the memory stores instructions that, when executed by the one or more hardware processors, cause the one or more hardware processors to identify the one or more actions to be performed in the testing process by further performing operations comprising:

parsing the one or more words included in the plurality of test steps to identify one or more noun phrases and one or more verb phrases in the plurality of test steps.

13. The system of claim 9, wherein the test script is generated in a test automation framework.

14. The system of claim 9, wherein the natural language processing uses a text processing library.

15. The system of claim 9, wherein the validation script is generated in a test automation framework.

16. The system of claim 9, wherein the memory stores instructions that, when executed by the one or more hardware processors, cause the one or more hardware processors to further perform operations comprising:

providing a user interface for a user to view the test script and set a folder location for storing the test script.

17. A non-transitory computer-readable medium storing instructions, for automatic generation of a test script and a validation script for an application under test, that, when executed by a processor, cause the processor to perform operations comprising:

acquiring a plurality of test steps from a database, the plurality of test steps being associated with a test case and including one or more words in natural language;

identifying one or more actions to be performed in a testing process based on the plurality of test steps by using natural language processing;

generating the test script based on the identified one or more actions, wherein the test script is executable by one or more processors to perform the plurality of test steps;

identifying an expected test result associated with each of the plurality of test steps by performing natural language processing on the plurality of test steps; and generating a validation script based on the expected test result associated with each of the plurality of test steps, wherein the validation script is executable by the one or more processors to validate whether the expected test result occurred, and wherein the natural language processing provide at least one of a context or a domain with respect to the application under test.

18. The non-transitory computer-readable medium of claim 17, wherein the non-transitory computer-readable medium stores instructions that, when executed by the processor, cause the processor to further perform operations comprising:

executing the test script and validation script on the application under test.

19. The non-transitory computer-readable medium of claim 18, wherein the non-transitory computer-readable medium stores instructions that, when executed by the processor, cause the processor to further perform operations comprising:

determining whether a user interface associated with the application under test is modified; and updating the test script and validation script based on the determination.

20. The non-transitory computer-readable medium of claim 17, wherein the non-transitory computer-readable medium stores instructions that, when executed by the processor, cause the processor identify the one or more actions to be performed in the testing process by further performing operations comprising:

parsing the one or more words included in the plurality of test steps to identify one or more noun phrases and one or more verb phrases in the plurality of test steps.

* * * * *